United States Patent [19]
Nougayrede et al.

[11] Patent Number: 6,056,936
[45] Date of Patent: *May 2, 2000

[54] CATALYTIC DESULPHURIZATION PROCESS FOR A GAS CONTAINING $H_2S$ AND $SO_2$ COMPOUNDS AND CATALYST FOR IMPLEMENTING SAID PROCESS

[75] Inventors: Jean Nougayrede, Pau; André Philippe, Orthez, both of France

[73] Assignee: Elf Exploration Production, Paris la Defense, France

[*] Notice: This patent issued on a continued prosecution application filed under 37 CFR 1.53(d), and is subject to the twenty year patent term provisions of 35 U.S.C. 154(a)(2).

[21] Appl. No.: 08/776,638

[22] PCT Filed: May 28, 1996

[86] PCT No.: PCT/FR96/00799

§ 371 Date: May 9, 1997

§ 102(e) Date: May 9, 1997

[87] PCT Pub. No.: WO96/38378

PCT Pub. Date: Dec. 5, 1996

[30] Foreign Application Priority Data

May 30, 1995 [FR] France ................................. 95 06331

[51] Int. Cl.⁷ .......................... B01D 53/50; B01D 53/52; B01J 23/00; C01B 17/04
[52] U.S. Cl. ...................... 423/574.1; 423/222; 423/230; 423/244.09; 423/244.1; 502/178; 502/302; 502/303; 502/305; 502/325; 502/340; 502/349; 502/354; 502/344
[58] Field of Search ..................................... 423/222, 230, 423/244.09, 244.1, 574.1, 576; 502/178, 302, 303, 304, 305, 325, 340, 349, 355, 344

[56] References Cited

U.S. PATENT DOCUMENTS

| 3,978,004 | 8/1976 | Daumas et al. | 252/462 |
|---|---|---|---|
| 4,054,642 | 10/1977 | Daumas | 423/574 R |
| 4,640,908 | 2/1987 | Dupin | 502/243 |
| 4,857,296 | 8/1989 | Brunelle et al. | 423/574 R |
| 4,957,724 | 9/1990 | Marold et al. | 423/574 R |
| 5,202,107 | 4/1993 | Kvasnikoff et al. | 423/574 R |

FOREIGN PATENT DOCUMENTS

| 0218302 | 4/1987 | European Pat. Off. . | |
|---|---|---|---|
| 0422999 | 4/1991 | European Pat. Off. . | |
| 129037 | 12/1977 | Germany . | |
| WO 87/02653 | 5/1987 | WIPO | 423/574.1 |
| 9112201 | 8/1991 | WIPO . | |
| WO 94/21359 | 9/1994 | WIPO | 423/230 |
| WO 94/21555 | 9/1994 | WIPO | 423/230 |

OTHER PUBLICATIONS

Copies of the English Translations for WO 91/12201 A1 and EP 0 422 999 A1.

*Primary Examiner*—Steven P. Griffin
*Assistant Examiner*—Timothy C Vanoy
*Attorney, Agent, or Firm*—Schnader Harrison Segal & Lewis LLP; Gerard J. Weiser

[57] ABSTRACT

A process is provided for the catalytic removal of sulfur compounds, such as hydrogen sulfide and sulfur dioxide, out of a gas by contacting the gas with catalyst composition containing a silicon carbide support and a catalyst component, such as a salt or elemental state of a metal, such as titanium, zirconium, yttrium, lanthanum, uranium, lead, molybdenum, iron, cobalt, copper, nickel, zinc and cadmium and an oxide of a metal, such as uranium, lead, calcium, magnesium and cadmium. The process may be conducted at a temperature above or below the dew point of sulfur.

61 Claims, No Drawings

CATALYTIC DESULPHURIZATION PROCESS FOR A GAS CONTAINING H₂S AND SO₂ COMPOUNDS AND CATALYST FOR IMPLEMENTING SAID PROCESS

This application is a national stage filing under 35 U.S.C. 371 PCT/FR96/00799, filed May 28, 1996.

The invention relates to a process for catalytic desulphurization of a gas containing the sulphur compounds $H_2S$ and $SO_2$ and possibly COS and/or $CS_2$, with recovery of the said compounds in the form of sulphur. It further relates to a catalyst for using this process.

It is known that $H_2S$ reacts with $SO_2$ in the presence of catalysts, based, for example, on one or several metal oxides such as alumina or titanium oxide, to form sulphur according to the Claus reaction which is written:

$$2H_2S + SO_2 \rightleftharpoons 3/x S_x + 2H_2O$$

Many processes for desulphurization of gases containing $H_2S$ and $SO_2$ use the Claus reaction in contact with a catalyst with a view to the recovery of the said compounds $H_2S$ and $SO_2$ in the form of sulphur.

In such processes the gas to be desulphurized, containing $H_2S$ and $SO_2$, is passed in contact with a catalyst which promotes the Claus reaction given above, this contact being produced at temperatures which are either higher than the dew point of the sulphur formed in the reaction gases, in which case the sulphur formed is present in the form of vapour in the reaction mixture originating from the reaction, or else at temperatures which are lower than the dew point of the sulphur formed, in which case the said sulphur is deposited on the catalyst, which makes it necessary to regenerate the sulphur-laden catalyst at regular intervals by purging with a nonoxidizing gas which is at a temperature of between 200° C. and 500° C.

In particular, the reaction between $H_2S$ and $SO_2$ at temperatures which are higher than the dew point of sulphur, that is to say at temperatures higher than approximately 180° C., can be carried out in contact with a catalyst consisting of alumina or bauxite (U.S. Pat. No. 2,403,451), of alumina associated with a zinc, cadmium, calcium or magnesium compound (FR-A-2126257), of activated alumina associated with a cobalt, nickel, iron or uranium oxide or sulphide compound (FR-A-2190517), of alumina associated with a titanium compound (FR-A-2224203), of alumina associated with a compound of yttrium, of lanthanum or of an element of the lanthanide series with atomic numbers ranging from 58 to 71 (FR-A-2242144), of titanium oxide (FR-A-2481145), or else of titanium oxide associated with an alkaline-earth metal sulphate (EP-A-0060741). The catalysts described in citations FR-A-2126257, FR-A-2190517, FR-A-224203, FR-A-2481145 and EP-A-0060741 are very particularly advantageous when the gas to be treated also contains organic sulphur compounds such as COS and/or $CS_2$, in addition to the sulphur compounds $H_2S$ and $SO_2$.

The reaction between $H_2S$ and $SO_2$ carried out at temperatures such that the sulphur formed is deposited on the catalyst can be performed, for its part, in contact with a catalyst consisting, for example, of activated alumina, silica, a mixture of silica and alumina or else a natural or synthetic zeolite (FR-A-2180473 and FR-A-2224196), of alumina associated with an iron, nickel, cobalt, copper or zinc compound (FR-A-2327960), of alumina associated with a compound of titanium, yttrium, lanthanum or lanthanide of atomic number ranging from 58 to 71 (WO-A-9112201), of titanium oxide associated with a nickel, iron or cobalt compound (EP-A-0215317 and EP-A-0218302) or else of active carbon (FR-A-1603452).

Catalysts such as the abovementioned, which are employed to promote the sulphur-forming Claus reaction between $H_2S$ and $SO_2$ and optionally the hydrolysis of the compounds COS and $CS_2$ to $H_2S$, still present some inadequacies in extended use.

Under the combined effect of temperature and of the presence of water the catalysts based on alumina, silica, titanium oxide or active carbon undergo, in time, transformations which are reflected in a decrease in the specific surface and in the porosity of the said catalysts and which result in a loss of their catalytic activity. In addition, alumina-based catalysts are liable to change in time owing to sulphate formation, and this is an additional cause of loss of catalytic activity. As far as the catalysts based on active carbon are concerned, precautions must be taken when they are used to avoid the combustion of the active carbon. Furthermore, when hydrocarbons are present in the gases to be treated, the abovementioned catalysts based on alumina, silica, titanium oxide or active carbon are liable to be poisoned by carbon and hydrocarbon deposits in their matrix, the catalysts thus poisoned not being capable of being regenerated, as a result of the physicochemical degradation which would be produced by the application of the high temperatures needed for the reactivation of these catalysts, for example by direct oxidation of the hydrocarbon materials. In addition, in the case of the catalysts made up of a catalytic phase capable of promoting the Claus reaction, associated with a support, the said catalytic phase tends to migrate into the support lattice, and this is accompanied by a loss in catalytic activity and it makes the recovery of the catalytic phase in the spent catalyst difficult or even often impossible. Finally, the abovementioned catalysts have a mediocre thermal conductivity which limits the heat transfer from the catalyst granules towards the gas phase. This results in a rise in the temperature within the catalyst granules, which limits the progress of the reactions.

It has now been found that it is possible to overcome the disadvantages of the Claus catalysts employed for promoting the sulphur-forming reaction between $H_2S$ and $SO_2$ and thus to obtain a process resulting in a high conversion with an improved selectivity for sulphur being maintained durably in time, by constituting the said catalysts of a catalytic phase capable of promoting the Claus reaction between $H_2S$ and $SO_2$ and optionally the hydrolysis of the compounds COS and $CS_2$ to $H_2S$, associated with a silicon carbide support.

The subject of the invention is therefore a process for catalytic desulphurization of a gas containing the sulphur compounds $H_2S$ and $SO_2$ with recovery of the said compounds in the form of sulphur, in which the gas to be desulphurized is passed in contact with a Claus catalyst consisting of a catalytic phase capable of promoting the Claus reaction between $H_2S$ and $SO_2$, associated with a support, the said process being characterized in that the Claus catalyst support consists of silicon carbide.

The gas to be desulphurized, which is brought into contact with the Claus catalyst according to the invention, contains $H_2S$ and $SO_2$ in an overall concentration of generally between 0.01% and 25% and preferably between 0.02% and 15% by volume. In the said gas the $H_2S:SO_2$ molar ratio is advantageously equal to approximately 2:1, a value corresponding to the stoichiometry of the Claus reaction, and can vary from 0.2:1 to 4:1 or more.

The gas to be desulphurized, which is treated according to the invention, may have various origins. In particular, this gas may result from the controlled combustion, in Claus stoichiometry, of a sour gas containing $H_2S$. It may also consist of a tail gas originating from a Claus sulphur plant. The gas to be desulphurized may also result from the addition of the required quantity of $SO_2$ to a sour gas containing a small quantity of $H_2S$ and originating, for example, from the gasification of coal or of heavy oils or else may be formed by the addition of the appropriate quantity of $H_2S$ to a gas containing a small quantity of $SO_2$, it being possible for the addition of $SO_2$ to the sour gas containing $H_2S$ or the addition of $H_2S$ to the gas containing $SO_2$ to be carried out during the bringing into contact with the catalyst which promotes the Claus reaction or, preferably, before this contact is brought about. The gas to be desulphurized may also contain organic sulphur compounds, for example COS and/or $CS_2$, whose overall concentration in most cases does not exceed 4% by volume of the gas to be desulphurized, but may possibly exceed this value.

In the Claus catalyst according to the invention the catalytic phase which is associated with the silicon carbide support contains at least one metal capable, in the form of oxide or of salt and/or in the elemental state, of promoting the sulphur-forming Claus reaction between $H_2S$ and $SO_2$. When the gas to be desulphurized contains one or more organic sulphur compounds such as COS and/or $CS_2$, in addition to the compounds $H_2S$ and $SO_2$, the active phase of the catalyst also contains at least one metal capable, within a certain temperature range, of promoting the hydrolysis of the said organic sulphur compounds to $H_2S$, it being possible for the said metal to be simultaneously capable, in the form of oxide or of salt and/or in the elemental state, of promoting the Claus reaction between $H_2S$ and $SO_2$. In particular, the active phase of the catalyst with a silicon carbide support contains at least one metal chosen from titanium, zirconium, yttrium, lanthanum, uranium, lead, molybdenum, iron, cobalt, nickel, calcium, zinc, magnesium, cadmium, lanthanides of atomic number ranging from 58 to 71 and, for example, neodymium, praseodymium, samarium or gadolinium, such a metal being capable, in the form of oxide or of salt and/or in the elemental state, of promoting the Claus reaction between $H_2S$ and $SO_2$ and simultaneously, in a certain temperature range, the hydrolysis of the organic sulphur compounds such as COS and/or $CS_2$ to $H_2S$. The catalytic phase or active phase associated with the silicon carbide support in the catalyst according to the invention, calculated as weight of metal, in most cases represents 0.1 to 20%, more particularly 0.2 to 15% and more especially 0.2 to 10% of the weight of the said catalyst. The silicon carbide support advantageously constitutes at least 40% and more particularly at least 50% of the weight of the catalyst.

The specific surface of the catalyst according to the invention may vary fairly widely according to the conditions of application of the desulphurization process. The said specific surface, determined by the BET nitrogen absorption method, may advantageously represent 2 $m^2/g$ to 600 $m^2/g$.

The Claus catalyst according to the invention may be prepared by making use of the various known methods for incorporating one or several metal compounds into a solid constituting a catalyst support. In particular, the operation may be carried out by impregnation of the silicon carbide support, which is in the form of powder, of tablets, of granules, of extrudates, of honeycomb monoliths or other forms of agglomerates, by means of a solution or of a sol, in a solvent such as water, with the desired metal compound or compounds, followed by drying of the impregnated support and calcination of the dried product at temperatures that can range from 250° C. to 500° C., the operation being optionally carried out in an inert atmosphere. The calcined catalyst may be subjected to a reduction treatment under hydrogen, for example between 200° C. and 500° C., to change the metal of the metal compound present in its active phase into the elemental state. It is also possible to envisage preparing the catalyst by operating so as to insert the catalytically active metal atoms like those mentioned above into the crystal lattice of the silicon carbide. This insertion of active material may be carried out either during the production of silicon carbide or during a subsequent stage.

The silicon carbide employed for constituting the support of the Claus catalyst according to the invention may consist of any one of the known silicon carbides, provided that it exhibits the required specific surface characteristics, namely a specific surface, determined by the BET nitrogen adsorption method, ranging, for example, from 2 $m^2/g$ to 600 $m^2/g$.

In particular, the said silicon carbide may be obtained by resorting to any one of the techniques described in citations EP-A-0313480 (corresponding to U.S. Pat. No. 4,914,070), EP-A-0440569, EP-A-0511919, EP-A-0543751 and EP-A-0543752.

The catalyst may, in particular, exhibit a particle size between 0.3 mm and 15 mm and more especially between 0.5 mm and 10 mm.

The contact times of the gaseous reaction mixture consisting of the gas to be desulphurized, with the catalyst according to the invention, may range from 0.2 seconds to 20 seconds and preferably from 0.4 seconds to 12 seconds, these values being given in normal pressure and temperature conditions (NTP contact time).

The desulphurization process according to the invention can be used at temperatures which are higher than the dew point of the sulphur formed during the reaction between $H_2S$ and $SO_2$, the said sulphur being then present in the form of vapour in the reaction mixture which leaves the catalytic reaction zone, and being separated from the said reaction mixture by condensation. The desulphurization process according to the invention may also be carried out by operating at temperatures that are lower than the dew point of the sulphur formed during the reaction between $H_2S$ and $SO_2$, the said sulphur then being deposited on the catalyst and the gaseous effluent collected at the exit from the catalytic reaction zone being substantially free from sulphur. The temperatures of use of the process according to the invention may advantageously be chosen between 30° C. and 500° C. For using the process at temperatures that are higher than the dew point of the sulphur formed in the reaction gases, temperatures of between 180° C. and 500° C. and more especially between 190° C. and 400° C. are chosen. For using the process at temperatures that are lower than the dew point of the sulphur formed, temperatures within the range 30° C. to 180° C. are chosen and more particularly within the range from 80° C. to 160° C., which encompasses the sulphur solidification region in the neighbourhood of 120° C.

When the process according to the invention is used at temperatures of between 180° C. and 500° C. and more particularly between 190° C. and 400° C., the contact of the gas to be desulphurized containing $H_2S$ and $SO_2$ with the Claus catalyst with a silicon carbide support may be brought about in a catalytic reaction zone, or several zones, containing the said catalyst. The number of catalytic reaction zones depends, among other things, on the composition of the gas to be desulphurized and on the performance it is desired to obtain. When several catalytic reaction zones are called for, the said zones are advantageously arranged in series. The catalyst present in the single catalytic reaction zone may consist entirely of a Claus catalyst according to the invention with a silicon carbide support or else may be made up of a layer of such a catalyst, associated with one or more layers of conventional Claus catalyst such as, for example, bauxite, alumina, zeolite, titanium oxide or zirconium oxide. When the operation is carried out in several catalytic reaction zones which, as indicated above, are advantageously arranged in series, at least one of the said catalytic reaction zones contains a Claus catalyst according to the invention with a silicon carbide support, whereas the other catalytic reaction zones contain one or several conventional Claus catalysts like, for example, those indicated above. In the catalytic reaction zone or zones containing the Claus catalyst according to the invention with a silicon carbide support, the said catalyst may constitute the whole of the catalyst bed of the catalytic reaction zone being considered, or else may form only a layer of the said catalyst bed, the remainder consisting of one or more layers of conventional Claus catalyst like, for example, those referred to above. The single catalytic reaction zone or each catalytic reaction zone, when several such zones are employed, operates at temperatures within the abovementioned ranges, namely between 180° C. and 500° C. and more particularly between 190° C. and 400° C. When the gas to be desulphurized, in addition to the sulphur compounds $H_2S$ and $SO_2$, also contains organic sulphur compounds, for example COS and/or $CS_2$, the single catalytic reaction zone or at least one of the catalytic reaction zones, when several such zones are employed, contains a Claus catalyst according to the invention with a silicon carbide support and capable of promoting the Claus reaction between $H_2S$ and $SO_2$ and the hydrolysis of the organic sulphur compounds to $H_2S$, for example catalyst according to the invention with a silicon carbide support in which the active phase is based on an oxide of at least one metal such as Ti, Zr, Zn, Cd, Ca, Mg, Mo or La, each catalytic reaction zone containing such a catalyst according to the invention operating at temperatures of between 180° C. and 500° C. and which are sufficient to carry out the hydrolysis of the organic sulphur compounds to $H_2S$. In each catalytic reaction zone containing the catalyst according to the invention, promoting the reaction between $H_2S$ and $SO_2$ and the hydrolysis of the organic sulphur compounds to $H_2S$, the said catalyst may further constitute the whole of the catalyst bed of the catalytic reaction zone being considered, or else may form only a layer of the said catalyst bed, the remainder consisting of one or more layers of conventional Claus catalyst as indicated above.

At the exit from the single catalytic reaction zone or from each of the catalytic reaction zones, when several such zones are employed, a gaseous effluent laden with sulphur vapour is collected, which gaseous effluent, before any subsequent Claus reaction, is passed into a cooling zone for the purpose of separating off most of the sulphur which it contains, by condensation.

If need be, the gaseous effluent which is collected at the exit from the single catalytic reaction zone or at the exit from the final catalytic reaction zone, when several catalytic reaction zones are employed in series, in the use at temperatures that are higher than the dew point of the sulphur formed in the reaction gases, may be subjected to an additional purification treatment after separation of the sulphur which it may contain, the said treatment depending on the nature and the quantity of the gaseous sulphur compounds remaining in the effluent.

The application of the process according to the invention at temperatures that are higher than the dew point of the sulphur formed in the reaction gases may constitute in particular the Claus reaction stage at the temperatures that are higher than the dew point of the sulphur, which is employed in the catalytic processes for the production of sulphur from a gas containing $H_2S$ of the type of those described in citations FR-A-2511663 and FR-A-2540092.

When the process according to the invention is used at temperatures that are lower than the dew point of the sulphur formed during the reaction between $H_2S$ and $SO_2$, that is to say at temperatures in the range 30° C. to 180° C. and more particularly in the range 80° C. to 160° C., the bringing of the gas to be desulphurized, which in this embodiment has an overall $H_2S$ and $SO_2$ content generally not exceeding 5% by volume and very particularly not exceeding 2.5% by volume, into contact with the Claus catalyst with a silicon carbide support results in the formation of sulphur which is deposited on the catalyst.

If the overall $H_2S$ and $SO_2$ concentration and/or the temperature of the gas to be desulphurized which is brought into contact with the Claus catalyst according to the invention are such that, as a result of the exothermicity of the Claus reaction, the temperature of the reaction mixture at the end of the reaction is liable to exceed the temperature limit beyond which the sulphur conversion tends to decrease, the heat energy released by the said reaction is removed by subjecting the catalyst to cooling by any known method. It is possible, for example, to perform this cooling with the aid of a cold fluid circulating in a system for indirect heat exchange with the catalytic mass. It is also possible to operate by placing the catalyst in a tubular reactor consisting of tubes arranged in a calandria, either with the catalyst present in the tubes and the cold fluid circulating between the tubes on the calandria side or else with a cold fluid circulating in the tubes and the catalyst present between the tubes on the calandria side. It is also possible to use the catalytic reaction in a reactor with a number of catalyst stages, with cooling of the reaction mixture between the successive catalytic stages by indirect heat exchange with a cold fluid, the heat exchange taking place inside or outside the catalytic reactor.

If the gas to be desulphurized contains a large quantity of water, for example greater than 10% by volume, in addition to the sulphur compounds $H_2S$ and $SO_2$, the reaction temperatures that are lower than the dew point of the sulphur formed are preferably chosen so as to be higher than the dew point of the water present in the gas to be desulphurized.

When the gas to be desulphurized, in addition to the sulphur compounds $H_2S$ and $SO_2$, also contains organic sulphur compounds, for example COS and/or $CS_2$, the said gas may be advantageously subjected to a hydrolysis stage before using the Claus reaction between $H_2S$ and $SO_2$ at temperatures that are lower than the dew point of the sulphur formed. This hydrolysis stage may be used by passing the gas to be desulphurized containing the organic sulphur compounds in contact with a catalyst of hydrolysis of the said organic compounds to $H_2S$, the said gas containing a sufficient quantity of water for this hydrolysis, the operation being carried out at temperatures of between 180° C. and 500° C. and sufficient for the hydrolysis to take place. The hydrolysis catalyst advantageously consists of a catalyst according to the invention, capable of promoting the hydrolysis of the organic sulphur compounds to $H_2S$ and particularly such a catalyst in which the active phase is based on a Ti, Zr, Zn, Cd, Ca, Mg, Mo or La oxide. The use according to the invention of the hydrolysis followed by the Claus reaction between $H_2S$ and $SO_2$ at temperatures that are lower than the dew point of the sulphur formed may be made, for example, as indicated in citations FR-A-2632626 and FR-A-2653422.

As the reaction between $H_2S$ and $SO_2$ progresses at temperatures that are lower than the dew point of the sulphur formed, the Claus catalyst gradually becomes laden with sulphur. Regeneration of the sulphur-laden catalyst is performed at regular intervals by purging the said catalyst with a gas, the operation being carried out at temperatures of between 200° C. and 500° C. and preferably between 250° C. and 450° C., to vaporize the sulphur retained on the catalyst, and then the regenerated catalyst is cooled to a temperature that is lower than the dew point of the sulphur for a new implementation of the reaction between $H_2S$ and $SO_2$, this cooling being carried out by means of a gas which has an appropriate temperature that is lower than 180° C.

The purging gas employed for regenerating the sulphur-laden catalyst may be such as methane, nitrogen, $CO_2$ or mixtures of such gases or may also consist of a fraction of the gas stream originating from the low-temperature Claus reaction stage or of a fraction of the gas to be desulphurized or of the desulphurized gas. The purging gas employed for the abovementioned regeneration may optionally contain a certain proportion of a reducing compound such as, for example, $H_2$, CO or $H_2S$, at least during the final stage of the regeneration, that is to say after the vaporization of most of the sulphur deposited on the Claus catalyst, for the purpose of possible reduction of the sulphates and/or of conditioning of the active material of the catalyst.

Depending on the active phase employed for the Claus catalyst with a silicon carbide support, the use of a reducing compound at the end of the regeneration stage is intended to restore the metal of the active phase of the catalyst from the sulphate/sulphite form, in which the said metal is present at the end of the desulphurization period, to the elemental metal and/or metal sulphide form, which constitute the active forms of the Claus catalyst to which it must be restored before it is used for the following desulphurization period.

The use of the Claus reaction while operating according to the invention at temperatures that are lower than the dew point of the sulphur formed may be made in a single catalytic reaction zone containing the Claus catalyst with a silicon carbide support, which operates alternately in a Claus reaction stage and in a regeneration/cooling stage. Such a use is adopted when the gas to be desulphurized contains a low overall content of sulphur compounds $H_2S$ and $SO_2$ and when, as a result, catalyst regeneration is not very frequent. The use of the catalytic reaction is advantageously implemented in a plurality of catalytic reaction zones arranged in parallel and each containing a Claus catalyst according to the invention with a silicon carbide support, these catalytic reaction zones operating so that at least one of the said zones operates in a regeneration/cooling stage, while the other zones are in a Claus reaction stage. It is also possible to operate by having one or several zones in a Claus catalytic reaction stage, at least one zone in a regeneration stage and at least one zone in a cooling stage. Each catalytic reaction zone may comprise a number of catalyst stages, for example two or three stages, with cooling of the reaction mixture between the successive catalytic stages, by indirect heat exchange with a cold fluid, the heat exchange taking place inside or outside the catalytic reaction zone. The implementation employing a plurality of catalytic reaction zones arranged in parallel, as indicated above, allows the treatment of the gas to be desulphurized to be carried out continuously.

The gas employed for the regeneration of the Claus catalyst preferably travels in a closed circuit from a heating zone, passing successively through the catalytic zone being regenerated, from which the sulphur is removed by vaporization, and a cooling zone in which most of the sulphur present in the said gas is separated off by condensation, to return to the heating zone. The regeneration gas may, of course, also travel in an open circuit, for example by employing the gas to be desulphurized or the desulphurized gas in order to constitute the said regeneration gas. In the case where the gas to be desulphurized is employed as regeneration gas, this gas is recycled upstream of the reaction zones after separation of the sulphur vaporized in the regeneration.

The gas employed for cooling the regenerated Claus catalyst is of the same type as that used for the regeneration of the sulphur-laden catalyst. The regeneration gas and cooling gas circuits may be independent of one another. However, according to one embodiment, the regeneration gas circuit defined above may also comprise a branch connecting the exit of its cooling zone to the entry of the zone being regenerated, bypassing its heating zone, and this allows the said heating zone to be short-circuited and thus the regeneration gas to be employed as cooling gas.

The method of using the process according to the invention for the sulphur-forming reaction between $H_2S$ and $SO_2$, at temperatures that are lower than the dew point of the sulphur formed during the reaction may advantageously constitute the Claus reaction stage at a temperature that is lower than the dew point of the sulphur (low-temperature Claus reaction) of the processes described in citations FR-A-2180473, FR-A-2224196, FR-A-2277877, FR-A-2511663, FR-A-2540092, FR-A-2589082, FR-A-2589140, FR-A-2589141, FR-A-2632626 and FR-A-2653422.

According to a particular embodiment of the process according to the invention, which can be employed both at temperatures that are higher than the dew point of the sulphur formed by the reaction between $H_2S$ and $SO_2$ and at temperatures that are lower than the said dew point, each of the Claus catalytic reaction zones or at least the first of the said zones when a plurality of Claus catalytic zones are employed in series is provided with a catalytic mass comprising (i) a leading layer consisting of a Claus catalyst according to the invention with a silicon carbide support, the catalytic phase of which contains, in the form of oxide or of salt and/or in the elemental state, at least one metal chosen from Fe, Ni, Co, Cu and Zn and (ii) an additional layer of a conventional Claus catalyst based on alumina, for example alumina, bauxite or zeolite. When employing a reduced proportion of a catalyst according to the invention, this particular embodiment makes it possible to extend in time the maintaining of the activity of the conventional Claus catalysts based on alumina which are used in the processes for the production of sulphur by reaction between $H_2S$ and $SO_2$, in particular when the gas to be treated contains a small quantity of oxygen which may range up to approximately 1% by volume. The abovementioned catalyst with a silicon carbide support, used in the leading layer, allows the oxygen present to be removed and thus protects the catalysts in the additional layer. In the case of an additional layer consisting of alumina-based catalysts the said leading layer forms a protection preventing their poisoning by sulphate formation on the alumina and thus allows the catalytic activity of the alumina to be maintained in respect of the Claus reaction and of the hydrolysis of the compounds COS and $CS_2$.

The invention is illustrated by the following examples, given without any limitation being implied.

EXAMPLE 1

Tests of implementation of the Claus reaction at temperatures that are higher than the dew point of the sulphur formed by the reaction between $H_2S$ and $SO_2$ were carried out by using either a catalyst according to the invention (tests 1.A.1, 1.A.2 and 1.A.3 according to the invention) or an alumina-based control catalyst (control tests 1.B.1, 1.B.2 and 1.B.3) and by operating in conditions employed on a sulphur plant for a first catalytic converter (tests 1.A.1 and 1.B.1), a second catalytic converter (tests 1.A.2 and 1.B.2) and a third catalytic converter (tests 1.A.3 and 1.B.3).

The alumina-based control catalyst consisted of beads, from 4 to 6 mm in diameter, of an activated alumina which had a BET specific surface of 253 $m^2/g$.

The catalyst according to the invention was made up of a silicon carbide support impregnated with a titanium compound and contained 4.8% of titanium by weight of the catalyst.

The preparation of the catalyst according to the invention was carried out as follows. First of all silicon carbide particles which had a particle size of between 0.8 mm and 1 mm and a BET specific surface of 150 $m^2/g$ were impregnated with titanium oxychloride in a quantity such as to provide the desired quantity of titanium in the resulting catalyst. The impregnated product obtained was dried at ambient temperature for 10 hours and then at 120° C. for 15 hours and then subjected to a calcination at 500° C. for 6 hours to produce the catalyst. The catalyst obtained contained, as indicated above, 4.8% of titanium by weight and had a BET specific surface of 132 $m^2/g$.

Each of the tests was carried out in a catalytic reactor containing the catalyst according to the invention (tests 1.A.1, 1.A.2 and 1.A.3 according to the invention) or the control catalyst (tests 1.B.1, 1.B.2 and 1.B.3). Each reactor comprised an entry and an exit, separated by a catalyst bed, a gas delivery conduit, the said conduit being connected to the reactor entry and equipped with a heater, and a conduit for discharge of the gases, extending the reactor exit and equipped with a steam-cooled sulphur condenser.

The gas to be treated, containing $H_2S$ and $SO_2$, employed for carrying out the Claus reaction, was preheated to a temperature θ by passing through the heater associated with the catalytic reactor, and then injected into the said reactor at this temperature. The gaseous effluent leaving the catalytic reactor, via the discharge conduit of the said reactor, was cooled to approximately 175° C. in the condenser associated with the catalytic reactor in order to separate off the sulphur present in the said effluent. The sulphur yield of the reaction was calculated from the $H_2S$ and $SO_2$ contents of the gas entering the catalytic reactor and of the gaseous effluent coming out of the sulphur condenser.

The operating conditions specific to the tests were the following:

Tests 1.A.1 and 1.B.1

The gas containing $H_2S$ and $SO_2$ delivered to the catalytic reactor contained, by volume, 9% of $H_2S$, 4.5% of $SO_2$, 20% of $H_2O$ and 66.5% of $N_2$. The exit temperature of the catalytic reactor was 300° C. These conditions result in a thermodynamic sulphur yield of 85.9%.

Tests 1.A.2 and 1.B.2

The gas containing $H_2S$ and $SO_2$ delivered to the catalytic reactor contained, by volume, 2.5% of $H_2S$, 1.25% of $SO_2$, 27% of $H_2O$ and 69.25% of $N_2$. The exit temperature of the catalytic reactor was 250° C. These conditions result in a thermodynamic sulphur yield of 78.7%.

Tests 1.A.3 and 1B.3

The gas containing $H_2S$ and $SO_2$ delivered to the catalytic reactor contained, by volume, 1% of $H_2S$, 0.5% of $SO_2$, 30% of $H_2O$ and 68.5% of $N_2$. The exit temperature of the catalytic reactor was 220° C. These conditions result in a thermodynamic sulphur yield of 70.8%.

The results obtained in the various tests are collated in Table I.

TABLE I

| Test | Catalyst | NTP contact time (s) | Sulphur yield (%) |
|---|---|---|---|
| 1.A.1 | $TiO_2/SiC$(*) | 0.3 | 84 |
|  |  | 0.6 | 85.9 |
|  |  | 1 | 85.9 |
|  |  | 2 | 85.9 |
| 1.B.1 | Alumina | 0.3 | 70 |
|  |  | 0.6 | 77 |
|  |  | 1 | 82 |
|  |  | 2 | 83 |
| 1.A.2 | $TiO_2/SiC$(*) | 0.3 | 62 |
|  |  | 0.6 | 71 |
|  |  | 1 | 75 |
|  |  | 2 | 78 |
| 1.B.2 | Alumina | 0.3 | 32 |
|  |  | 0.6 | 52 |
|  |  | 1 | 59 |
|  |  | 2 | 70 |
| 1.A.3 | $TiO_2/SiC$(*) | 0.3 | 49 |
|  |  | 0.6 | 57 |
|  |  | 1 | 64 |
|  |  | 2 | 67 |
| 1.B.3 | Alumina | 0.3 | 25 |
|  |  | 0.6 | 46 |
|  |  | 1 | 55 |
|  |  | 2 | 56 |

(*)The catalyst employed in tests 1.A.1, 1.A.2 and 1.A.3 according to the invention is abbreviated to "$TiO_2/SiC$".

Inspection of the results which appear in Table I reveals that the implementation of the Claus reaction carried out as the invention proposes with a Claus catalyst with a silicon carbide support produces much higher sulphur yields, at comparable contact times, than those obtained with a conventional Claus catalyst like alumina.

In addition, it has also been noted that the introduction of 2000 vpm of oxygen into the gas containing $H_2S$ and $SO_2$ to be treated does not alter the sulphur yields obtained with the catalyst according to the invention, whereas these yields decrease substantially in time with the alumina catalyst, chiefly at the relatively low temperatures employed in the second and third catalytic reactors operating above the dew point of the sulphur.

EXAMPLE 2

By operating in catalytic reactors of structure comparable to that of the catalytic reactors employed in Example 1, tests were carried out according to the invention (tests 2.A.1 and 2.A.2) and control tests (tests 2.B.1 and 2.B.2) were carried out on the hydrolysis of organic sulphur compounds present in gases containing $H_2S$ and $SO_2$ subjected to a catalytic treatment in the operating conditions of the first catalytic converter of sulphur plants, by making use either of a catalyst according to the invention (tests 2.A.1 and 2.A.2), identical to the catalyst containing titanium on a silicon carbide support described in Example 1, or with a control catalyst (tests 2.B.1 and 2.B.2) identical to the alumina-based catalyst employed in the said Example 1.

Besides $H_2S$ and $SO_2$, the gas to be treated contained an organic sulphur compound consisting of $CS_2$ (tests 2.A.1 and 2.B.1) or of COS (tests 2.A.2 and 2.B.2). The gaseous effluent leaving the catalytic reactor, via the discharge conduit of the said reactor, was cooled as indicated in Example 1 in order to separate off the sulphur present in the said effluent. The efficiency of hydrolysis of the compound COS or $CS_2$ was determined from the COS or $CS_2$ contents of the gas entering the catalytic reactor and of the gaseous effluent coming out of the sulphur condenser, the said contents being obtained by chromatographic analysis.

The operating conditions specific to the tests were the following:

Tests 2.A.1 and 2.B.1

The gas to be treated delivered to the catalytic reactor contained, by volume, 7% of $H_2S$, 4% of $SO_2$, 0.8% of $CS_2$, 28% of $H_2O$ and 60.2% of $N_2$. The exit temperature of the catalytic reactor was 320° C.

Tests 2.A.2 and 2.B.2

The gas to be treated delivered to the catlytic reactor contained, by volume, 7% of $H_2S$, 3.75% of $SO_2$, 0.5% of COS, 28% of $H_2O$ and 60.75% of $N_2$. The exit temperature of the catalytic reactor was 320° C.

The results obtained in the various tests are collated in Table II.

TABLE II

| Test | Catalyst | NTP contact time (s) | Compound hydrolysed | Hydrolysis efficiency (%) |
|---|---|---|---|---|
| 2.A.1 | $TiO_2$/SiC | 1 | $CS_2$ | 70 |
| | | 2 | | 85 |
| | | 4 | | 97 |
| 2.B.1 | Alumina | 1 | $CS_2$ | 40 |
| | | 2 | | 55 |
| | | 4 | | 70 |
| 2.A.2 | $TiO_2$/SiC | 1 | COS | 84 |
| | | 2 | | 96 |
| | | 4 | | 100 |
| 2.B.2 | Alumina | 1 | COS | 57 |
| | | 2 | | 68 |
| | | 4 | | 84 |

Inspection of the results which appear in Table II again reveals that the efficiency of hydrolysis according to the invention of the organic sulphur compounds $CS_2$ and COS is very substantially improved, at comparable contact times, in comparison with that obtained with a conventional Claus catalyst like alumina.

EXAMPLE 3

Tests of implementation of the Claus reaction at temperatures that are lower than the dew point of the sulphur formed by the reaction between $H_2S$ and $SO_2$ were performed by using either a catalyst according to the invention (test 3.A.1 according to the invention) or an alumina-based control catalyst (control catalyst 3.B.1).

The alumina-based control catalyst consisted of beads, from 2 to 4 mm in diameter, of an activated alumina which had a BET specific surface of 242 $m^2$/g.

The catalyst according to the invention was made up of a silicon carbide support impregnated with a titanium compound to represent 5% of titanium by weight of the catalyst.

The preparation of the catalyst employed in the test according to the invention was carried out as follows. First of all silicon carbide particles which had a particle size of between 2 and 4 mm and a BET specific surface of 150 $m^2$/g were impregnated with titanium oxychloride in a quantity such as to provide the desired quantity of titanium in the resulting catalyst. The impregnated product was dried at ambient temperature and then at 120° C. and then calcined as shown in Example 1 to produce the catalyst. The titanium catalyst contained, as indicated above, 5% by weight of titanium and had a BET specific surface of 130 $m^2$/g.

Each of the tests was carried out in a catalytic conversion reactor which had an entry and an exit separated by a stationary bed of catalyst promoting the Claus reaction, the said reactor operating so that, alternately, by means of valves that could be switched by a clock, it was in a reaction stage, that is to say had its entry connected to a delivery conduit for the gaseous mixture to be desulphurized, or else in a regeneration/cooling stage, that is to say was purged with a synthetic gaseous mixture heated to 300° C. and consisting, by volume, of 70% of nitrogen and 30% of $H_2O$. During the regeneration the sulphur deposited on the catalyst was vaporized and entrained by the purging gas and then separated from the latter, at the reactor exit, by condensation. The regenerated reactor was then cooled in order to be brought back to the appropriate temperature for the following purification, the said cooling being carried out by purging with the regeneration gas maintained at a temperature of approximately 80° C.

In each of the tests 3.A.1 and 3.B.1 the gas containing $H_2S$ and $SO_2$ delivered to the catalytic reactor in a Claus reaction stage contained, by volume, 0.28% of $H_2S$, 0.14% of $SO_2$, 30% of $H_2O$ and 69.58% of $N_2$, the said gas having a flow rate corresponding to a residence time in contact with the Claus catalyst of 4 seconds in normal pressure and temperature conditions. The exit temperature of the reactor in a Claus reaction stage was 140° C. At the end of the regeneration the regenerated catalyst was cooled to a temperature of approximately 140° C before being returned to a purification (Claus reaction) stage.

The catalytic reactor operated alternately for 30 hours in a Claus catalytic reaction stage and for 30 hours, including 8 hours' cooling, in a regeneration/cooling stage.

After 50 working cycles, each including a Claus reaction (desulphurization) stage and a regeneration/cooling stage, the overall content of the compounds $H_2S$ and $SO_2$ in the desulphurized gas leaving the catalytic reactor in a Claus reaction stage became stable at a value $C_R$. The said value was determined by chromatographic analysis and the sulphur yield of the Claus reaction was calculated from this value and from the overall content Co of the compounds $H_2S$ and $SO_2$ in the gas to be treated.

The results obtained in the tests are collated in Table III.

TABLE III

| Test | Catalyst | $C_R$ (vpm) | Sulphur yield (%) |
|---|---|---|---|
| 3.A.1 | $TiO_2$/SiC | 710 | 83.1 |
| 3.B.1 | Alumina | 1050 | 75 |

Inspection of the results which appear in Table III reveals that the implementation of the Claus reaction when operating with a Claus catalyst according to the invention with a silicon carbide support, at temperatures that are lower than the dew point of the sulphur formed by the reaction between $H_2S$ and $SO_2$, again produces sulphur yields which are improved in comparison with those obtained with a conventional Claus catalyst like alumina.

EXAMPLE 4

Tests of implementation of the Claus reaction starting with a gas containing, besides $H_2S$ and $SO_2$, a small quantity of oxygen were performed by operating at temperatures that were higher than the dew point of the sulphur formed by the reaction between $H_2S$ and $SO_2$ on a catalytic mass consisting either of a leading layer of a catalyst containing nickel on a silicon carbide support, followed by a layer of an alumina-based conventional Claus catalyst (test 4.A.1 according to the invention) or only the alumina-based conventional Claus catalyst (control test 4.B.1).

The alumina-based control catalyst consisted of beads, from 2 to 4 mm in diameter, of an activated alumina which had a BET specific surface of 263 m²/g.

The catalyst according to the invention was made up of a silicon carbide support impregnated with a nickel compound and contained, by weight, 4% of nickel, the said catalyst having a BET specific surface of 138 m²/g.

The catalyst according to the invention was obtained by impregnating particles of microporous silicon carbide with an appropriate quantity of nickel acetate in aqueous solution, followed by drying of the impregnated product at 100° C. and calcination of the dried product at 300° C. for three hours. The silicon carbide particles, of mean size ranging from 2 to 4 mm, had a BET specific surface of 150 m²/g.

Each of the tests was carried out in a catalytic reactor containing the catalytic mass according to the invention (test 4.A.1) or the control catalytic mass (test 4.B.1) and operating isothermally, the said reactor having a structure comparable to that of the reactor employed in Example 1 and being equipped with means allowing its temperature to be maintained at a given value.

The gas to be treated, injected into the catalytic reactor, contained, by volume, 9% of $H_2S$, 4.5% of $SO_2$, 27% of $H_2O$, 0.2% of oxygen, 0.5% of COS, 0.2% of $CS_2$ and 58.6% of $N_2$.

The catalytic reactor was maintained at a temperature of 320° C. during each test.

The gaseous effluent leaving the catalytic reactor via the discharge conduit of this reactor was cooled to approximately 175° C. in the condenser associated with the catalytic reactor in order to separate the sulphur present in the said effluent. The sulphur yield of the reaction was determined, as indicated in Example 1, after an operating period of 800 hours.

The operating conditions specific to the tests were the following:
Test 4.A.1
The NTP contact times of the gas to be treated with the leading layer and then with the alumina-based layer of the catalytic mass according to the invention were 0.5 s and 1 s respectively.
Test 4.B.1
The NTP contact time of the gas to be treated with the alumina-based catalytic mass was 1.5 s.
The results obtained are shown in Table IV.

TABLE IV

| Test | Catalytic mass | NTP contact time (s) | $Y_{800}$(*) (%) | COS and $CS_2$ conversion | |
|---|---|---|---|---|---|
| | | | | COS (%) | $CS_2$ (%) |
| 4.A.1 | NiO/SiC then alumina | 0.5 then 1 | 78 | 95 | 55 |
| 4.B.1 | Alumina | 1.5 | 70 | 60 | 15 |

(*)$Y_{800}$ denotes the yield of the Claus reaction, based on the disappearance of $SO_2$, after 800 hours' operation.

Inspection of the results which appear in Table IV reveals the effectiveness of the catalyst according to the invention (NiO/SiC) in preventing the detrimental effects of oxygen on the activity of a conventional Claus catalyst like alumina.

EXAMPLE 5

Tests, namely a test 5.A.1 according to the invention and two control tests 5.B.1 and 5.C.1, of the implementation of the Claus reaction starting with a gas containing, besides $H_2S$ and $SO_2$, a small quantity of oxygen, were performed by operating at temperatures that were lower than the dew point of the sulphur formed by the reaction between $H_2S$ and $SO_2$ on a catalytic mass differing from one test to another and made up as shown below.
Test 5.A.1 (According to the Invention)
The catalytic mass consisted of a leading layer of the catalyst containing nickel with a silicon carbide support described in Example 4, followed by a layer of an alumina which had a BET specific surface of 263 m²/g and was in the form of beads which had a diameter of 2 to 4 mm.
Test 5.B.1 (Control)
The catalytic mass consisted of a leading layer of an iron catalyst on an alumina support, followed by a layer of an alumina identical with that employed in test 5.A.1.
Test 5.C.1 (Control)
The catalytic mass consisted only of a layer of an alumina identical with that employed in tests 5.A.1 and 5.B.1.

The iron catalyst, containing 4.5% of iron by weight of the catalyst, was prepared by impregnation of activated alumina beads which had a diameter of 2 to 4 mm and a BET specific surface of 263 m²/g, with the appropriate quantity of ferrous sulphate in aqueous solution and then drying of the impregnated product at 100° C. and calcination of the dried product at 300° C. for 3 hours.

Each of the tests was carried out in a catalytic conversion reactor which had an entry and an exit separated by a stationary bed of the chosen catalytic mass, the said reactor operating so that, alternately, by means of valves that could be switched by a clock, it was in a reaction stage, that is to say had its entry connected to a delivery conduit for the gaseous mixture to be desulphurized, or else in a regeneration/cooling stage, that is to say was purged with a synthetic gaseous mixture heated to 300° C. and consisting, by volume, of 10% of $H_2S$, 33% of $H_2O$ and 57% of $N_2$. During the regeneration the sulphur deposited on the catalytic mass was vaporized and entrained by the purging gas and then separated from the latter, at the reactor exit, by condensation. The regenerated reactor was then cooled in order to be brought back to the appropriate temperature for the following purification, the said cooling being carried out by purging with a gas consisting of 38% of $H_2O$ and of 62% of $N_2$, by volume, and being at a temperature of approximately 80° C.

In each of the tests 5.A.1, 5.B.1 and 5.C.1 the gas containing $H_2S$ and $SO_2$ delivered to the catalytic reactor in a Claus reaction stage contained, by volume, 0.8% of $H_2S$, 0.4% of $SO_2$, 0.08% of oxygen, 29% of $H_2O$ and 69.72% of $N_2$.

In test 5.A.1 the NTP contact times of the gas to be treated with the leading layer of nickel catalyst and then with the alumina layer was 2.2 s and 4.4 s respectively.

In test 5.B.1 the NTP contact times of the gas to be treated with the leading layer of iron catalyst and then with the alumina layer were 2.2 s and 4.4 s respectively.

In test 5.C.1 the NTP contact time of the gas to be treated with the only alumina layer was 6.6 s.

The temperature of the reactor was maintained at 136° C during the Claus reaction stage of each of the tests. At the end of the regeneration the regenerated catalyst was cooled to this temperature before being returned to a purification (Claus reaction) stage.

In each test the catalytic reactor operated alternately for 18 hours in a Claus catalytic reaction stage and for 6 hours, including 1.5 hours' cooling, in a regeneration/cooling stage.

After 20 working cycles, each comprising a Claus reaction (purification) stage and a regeneration/cooling stage, the overall content $C_G$ of the compounds $H_2S$ and $SO_2$ in the desulphurized gas leaving the catalytic reactor was determined by chromatographic analysis. The sulphur yield of the Claus reaction was calculated from this value $C_G$ and from the overall content Co of the compounds $H_2S$ and $SO_2$ present in the gas to be treated.

The results obtained are collated in Table V.

TABLE V

| Test | Catalytic mass | NTP contact time (s) | $C_G$ (v.p.m.) | Sulphur yield (%) |
|---|---|---|---|---|
| 5.A.1 | Catalyst containing Ni with SiC support then alumina | 2.2 then 4.4 | 550 | 95.4 |
| 5.B.1 | Catalyst containing Fe with alumina support then alumina | 2.2 then 4.4 | 710 | 94.1 |
| 5.C.1 | Alumina | 6.6 | 1850 | 84.5 |

Inspection of the results appearing in Table V reveals the effectiveness of the leading layer made of catalyst according to the invention (Nio/SiC) in preventing the detrimental effects of oxygen on the activity of the conventional Claus catalyst consisting of alumina. It also appears that, in this function, the catalyst according to the invention is more efficient than the catalyst containing iron on alumina support, employed hitherto.

We claim:

1. A Claus catalyst promoting a sulphur-forming reaction between $H_2S$ and $SO_2$ comprising a catalytic phase capable of promoting the reaction and being associated with a support comprising silicon carbide of at least 40 percent by weight of the catalyst, wherein the catalytic phase is made up, in the form of a salt and/or in the elemental state, of at least one metal selected from the group consisting of titanium, zirconium, yttrium, lanthanum, uranium, lead, molybdenum, iron, cobalt, nickel, zinc and cadmium.

2. The catalyst of claim 1, wherein the catalytic phase associated with the silicon carbide support, counted as weight of metal, represents 0.1 to 20% of the weight of the catalyst.

3. The catalyst of claim 2 wherein the catalytic phase represents 0.2% to 15% of the weight of the catalyst.

4. The catalyst of claim 3 wherein the catalytic phase represents 0.2% to 10% of the weight of the catalyst.

5. The catalyst of claim 1 which has a specific surface, determined by the BET nitrogen adsorption method, ranging from 2 $m^2/g$ to 600 $m^2/g$.

6. The catalyst of claim 1, which has a particle size of between 0.3 mm and 15 mm.

7. The catalyst of claim 6 wherein the particle size is between 0.5 mm and 10 mm.

8. The Claus catalyst of claim 1 in which the percentage by weight of the silicon carbide is at least 50 percent.

9. The Claus catalyst of claim 8 in which the support consists essentially of silicon carbide.

10. The catalyst of claim 1, wherein the metal of the catalytic phase is titanium.

11. A Claus catalyst promoting a sulphur-forming reaction between $H_2S$ and $SO_2$ comprising a catalytic phase capable of promoting the reaction and being associated with a support comprising silicon carbide of at least 40 percent by weight of the catalyst, wherein the catalytic phase is made up, in the form of oxide, of at least one metal selected from the group consisting of uranium and cadmium.

12. The catalyst of claim 11 wherein the silicon carbide support represents at least 50% of the weight of the catalyst.

13. The Claus catalyst of claim 11, wherein the support consists essentially of silicon carbide.

14. A two zone catalytic mass comprised of (i) a leading zone catalyst constituted by a catalytic phase associated with a support comprising silicon carbide of at least 40% by weight of the catalyst and (ii) an additional zone positioned behind and adjoining said leading zone, the additional zone being comprised of an alumina-based catalyst selected from the group consisting of alumina, bauxite and zeolite and the catalytic phase of the catalyst forming the leading zone being made up, in the form of a salt or in the elemental state or both, of at least one metal selected from the group consisting of Fe, Ni, Co, Cu and Zn.

15. The catalytic mass of claim 14, wherein the metal present in the catalytic phase of the catalyst forming the leading zone consists of nickel or iron.

16. The catalytic mass of claim 14, wherein the catalyst forming the leading zone contains at least 50% by weight of silicon carbide.

17. The catalytic mass of claim 14, wherein the catalyst forming the leading zone has a specific surface determined by the BET nitrogen adsorption method which is in the range of 2 $m^2/g$ to 600 $m^2/g$.

18. The catalytic mass of claim 14, wherein the amount of catalytic phase in the catalyst forming the leading zone, calculated as weight of metal, represents 0.1% to 20% of the weight of the catalyst.

19. A process for the catalytic desulphurization of a gas comprising the sulphur compounds $H_2S$ and $SO_2$ with recovery of the compounds in the form of sulphur which comprises contacting the gas to be desulphurized with a Claus catalyst and at a reaction temperature in the range of 30° C. to 180° C., to provide sulphur which deposits on the catalyst, said Claus catalyst comprising a catalytic phase which is effective to promote the Claus reaction between $H_2S$ and $SO_2$ and is associated with a support comprising silicon carbide of at least 40% by weight of the catalyst, said catalytic phase being selected from the group consisting of (a) a catalytic phase made up, in the form of a salt or in the elemental state or both, of at least one metal selected from the group consisting of titanium, zirconium, yttrium, lanthanum, uranium, lead, molybdenum, iron, cobalt, copper, nickel, zinc and cadmium and (b) a catalytic phase made up, in the form of oxide, of at least one metal selected from the group consisting of uranium, lead, calcium, magnesium and cadmium.

20. The process of claim 19 which comprises subjecting the gas to be desulphurized which contains organic sulphur compounds in an overall concentration not exceeding 4% by volume prior to being contacted with the Claus catalyst to a catalytic hydrolysis carried out at temperatures of between 180° C. and 500° C. and sufficient for performing the hydrolysis of the organic sulphur compounds.

21. The process of claim 20 wherein the organic sulphur compounds are selected from the group consisting of COS and $CS_2$.

22. The process of claim 20 wherein the catalytic hydrolysis of the organic sulphur compounds is promoted by a catalyst which has a catalytic phase comprised of at least one oxide of a metal, said metal being selected from the group consisting of Ti, Zr, Zn, Cd, Ca, Mg, Mo, and La.

23. The process of claim 19, wherein the gas to be desulphurized is contacted with a two zone catalytic mass comprised of (i) a leading zone of the Claus catalyst with the silicon carbide support, the catalytic phase of which is made up of at least one metal selected from the group consisting of Fe, Ni, Co, Cu and Zn in the form of a salt or in the elemental state or both, and (ii) positioned behind and adjoining the leading zone, an additional zone comprised of an alumina-based catalyst selected from the group consisting of alumina, bauxite and zeolite, the leading zone preventing the additional zone from being deactivated.

24. The process of claim 23 wherein the temperature of bringing the gas into contact with the catalyst is between 80° C. and 160° C.

25. The process of claim 23, wherein the gas to be desulphurized comprises up to 1% by volume of oxygen which the leading zone of the catalytic mass contributes to remove.

26. The process of claim 19 wherein the sulphur-laden catalyst is subjected to a regeneration by purging with a gas, the operation being carried out at temperatures of between 200° C. and 500° C. to vaporize the sulphur retained on the catalyst, and then cooling the regenerated catalyst substantially to the reaction temperature for a new contact to be brought about with the gas to be desulphurized, the cooling being carried out by means of a gas which has a temperature lower than 180° C.

27. The process of claim 26 wherein the regeneration is at a temperature between 250° C. and 450° C.

28. The process of claim 26 wherein the purging gas contains a reducing compound during the final stage of the regeneration.

29. The process of claim 28 wherein the reducing compound is selected from the group consisting of $H_2$, CO, and $H_2S$.

30. The process of claim 19, wherein the gas to be desulphurized contains $H_2S$ and $SO_2$ in an overall concentration of between 0.01% and 25% by volume.

31. The process of claim 30, wherein the overall concentration of $H_2S$ and $SO_2$ is between 0.02% and 15% by volume.

32. The process of claim 19, wherein the catalytic phase associated with the silicon carbide support, calculated as a weight of metal, represents 0.1 to 20% of the weight of the catalyst.

33. The process of claim 32, wherein the catalytic phase, calculated as weight of metal, represents 0.2% to 15% of the weight of the catalyst.

34. The process of claim 19, wherein the catalyst with the silicon carbide support has a specific surface determined by the BET nitrogen absorption method ranging from 2 $m^2/g$ to 600 $m^2/g$.

35. The process of claim 19 wherein the time of contact of the gas to be desulphurized with the catalyst is between 0.2 seconds to 20 seconds.

36. The process of claim 35 wherein the time of contact is between 0.4 seconds and 12 seconds.

37. The process of claim 19 wherein the temperature of the gas to be desulphurized into contact with the catalyst is within the range 80° C. to 160° C.

38. The process of claim 19 wherein the $H_2S:SO_2$ molar ratio in the gas to be desulphurized has a value varying from 0.2:1 to 4:1.

39. The process of claim 38 wherein the $H_2S:SO_2$ molar ratio is about 2:1.

40. The process of claim 19 in which the percentage by weight of the silicon carbide is at least 50 percent.

41. The process of claim 40 in which the silicon carbide support consists essentially of silicon carbide.

42. A process for the catalytic desulphurization of a gas comprising the sulphur compounds $H_2S$ and $SO_2$ with a recovery of the compounds in the form of sulphur which comprises contacting the gas to be desulphurized at a reaction temperature in the range of above 180° C. to 500° C., to form sulphur which is released in the vapor state, with a Claus catalyst comprising a catalytic phase associated with a support, wherein the support comprises silicon carbide of at least 40% by weight of the catalyst and wherein the catalytic phase is selected from the group consisting of (a) a catalytic phase made up, in the form of a salt or in the elemental state or both, of at least one metal selected from the group consisting of titanium, zirconium, yttrium, lanthanum, uranium, lead, molybdenum, iron, cobalt, copper, nickel, zinc and cadmium and (b) a catalytic phase made up in the form of oxide of at least one metal selected from the group consisting of uranium and cadmium.

43. The process of claim 42, wherein the catalytic phase associated with the silicon carbide support, calculated as weight of metal, represents 0.1 to 20% of the weight of the catalyst.

44. The process of claim 43 wherein the catalytic phase represents 0.2% to 15% of the weight of the catalyst.

45. The process of claim 44 wherein the catalytic phase represents 0.2% to 10% of the weight of the catalyst.

46. The process of claim 42, wherein the catalyst with silicon carbide support has a specific surface, determined by the BET nitrogen adsorption method, ranging from 2 $m^2/g$ to 600 $m^2/g$.

47. The process of claim 42 wherein the overall concentration of $H_2S$ and $SO_2$ is between 0.02% and 15% by volume.

48. The process of claim 42 wherein the $H_2S:SO_2$ molar ration is about 2:1.

49. The process of claim 42 wherein the temperature of contact is between 190° C. and 400° C.

50. The process of claim 42 in which the percentage by weight of the silicon carbide is at least 50 percent.

51. The process of claim 50 in which the silicon carbide support consists essentially of silicon carbide.

52. The process of claim 42 which comprises subjecting the gas to be desulphurized which contains organic sulphur compounds in an overall concentration not exceeding 4% by volume to a catalytic hydrolysis carried out at temperatures of between 180° C. and 500° C. and sufficient for performing the hydrolysis of the organic sulphur compounds to $H_2S$, the catalytic phase of said catalyst containing or being a promoter of hydrolysis of said sulphur compounds.

53. The process of claim 52 wherein the temperature of the gas to be desulphurized into contact with the catalyst is within the range 190° C. to 400° C.

54. The process of claim 42, wherein the gas to be desulphurized is contacted with a two zone catalytic mass comprised of (i) a leading zone of the Claus catalyst with the silicon carbide support, the catalytic phase of which is made up of at least one metal selected from the group consisting of Fe, Ni, Co, Cu and Zn in the form of a salt or in the elemental state or both, and (ii) positioned behind and adjoining the leading zone, an additional zone comprised of an alumina-based catalyst selected from the group consisting of alumina, bauxite and zeolite, the leading zone preventing the additional zone from being deactivated.

55. The process of claim 42, wherein the gas to be desulphurized contains $H_2S$ and $SO_2$ in an overall concentration of between 0.01% and 25% by volume.

56. The process of claim 55, wherein the overall concentration of $H_2S$ and $SO_2$ is between 0.02% and 15% by volume.

57. The process of claim 42 wherein the $H_2S:SO_2$ molar ratio in the gas to be desulphurized has a value varying from 0.2:1 to 4:1.

58. The process of claim 52 wherein the $H_2S:SO_2$ molar ratio is about 2:1.

59. The process of claim 42 wherein the time of contact of the gas to be desulphurized with the catalyst is between 0.2 seconds to 20 seconds.

60. The process of claim 59 wherein the time of contact is between 0.4 seconds and 12 seconds.

61. The process of claim 42 wherein the gas to be desulphurized comprises up to 1% volume of oxygen which the silicon carbide support contributes to remove.

* * * * *